(12) United States Patent
Somuah et al.

(10) Patent No.: US 10,554,709 B2
(45) Date of Patent: Feb. 4, 2020

(54) STREAM PROCESSING UTILIZING VIRTUAL PROCESSING AGENTS

(71) Applicant: Microsoft Technology Licensing, LLC, Redmond, WA (US)

(72) Inventors: Henry Hooper Somuah, Seattle, WA (US); Sergey Bykov, Redmond, WA (US); Tamir Melamed, Redmond, WA (US); Robert Louis Rodi, Kirkland, WA (US); Felix Cheung, Redmond, WA (US); Michael William Malyuk, Redmond, WA (US); Andrew Alexander Hesky, Kirkland, WA (US); Gabriel Kliot, Redmond, WA (US); Jorgen Thelin, Redmond, WA (US); Alan Stuart Geller, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 14/326,239

(22) Filed: Jul. 8, 2014

(65) Prior Publication Data
US 2016/0014175 A1 Jan. 14, 2016

(51) Int. Cl.
*H04L 29/08* (2006.01)
*A63F 13/85* (2014.01)
(Continued)

(52) U.S. Cl.
CPC ............ *H04L 65/60* (2013.01); *G06F 9/5005* (2013.01); *H04L 67/10* (2013.01); *A63F 13/85* (2014.09);
(Continued)

(58) Field of Classification Search
CPC ....... H04L 67/306; H04L 67/22; H04L 67/12; H04L 65/4084; H04L 65/4061;
(Continued)

(56) References Cited

U.S. PATENT DOCUMENTS 6,829,770 B1  12/2004  Hinson et al.
8,286,153 B2  10/2012  Gu et al.
(Continued)

FOREIGN PATENT DOCUMENTS

CN  101960825 A  1/2011
CN  103780678 A  5/2014
(Continued)

OTHER PUBLICATIONS

PCT International Search Report and the Written Opinion for Application No. PCT/US2015/039170, dated Oct. 14, 2015, 12 pps.
(Continued)

*Primary Examiner* — Tom Y Chang
(74) *Attorney, Agent, or Firm* — Newport IP, LLC; Jacob P. Rohwer

(57) ABSTRACT

Technologies are described herein for event delivery and stream processing utilizing virtual processing agents. Upon receiving an event publication in a queue, a runtime system identifies one or more virtual processing agents that might be interested in, but have not explicitly subscribed to, the published event. Event information of the published event is then delivered to the identified virtual processing agents. Prior to the actual delivery, the runtime system further determines if the virtual processing agents have been activated and activates those processing agents that have not been activated. Based on the received event information, some of the virtual processing agents might decide to explicitly submit subscriptions to receive more events from the queue. The explicit subscriptions will trigger the runtime
(Continued)

system to deliver the subscribed events to the processing agents, which might include past events that have been published in the queue before the explicit subscription is received.

20 Claims, 8 Drawing Sheets

(51) Int. Cl.
    *A63F 13/86*     (2014.01)
    *H04L 29/06*     (2006.01)
    *G06F 9/50*     (2006.01)

(52) U.S. Cl.
    CPC .......... *A63F 13/86* (2014.09); *A63F 2300/577* (2013.01); *H04L 65/4061* (2013.01); *H04L 65/4069* (2013.01); *H04L 65/4084* (2013.01)

(58) Field of Classification Search
    CPC ............ H04L 65/4069; H04N 21/4532; H04N 21/2668; H04N 21/2187; H04N 21/25891
    See application file for complete search history.

(56) References Cited

U.S. PATENT DOCUMENTS

| | | | |
|---|---|---|---|
| 8,291,006 B2 | 10/2012 | Andrade et al. | |
| 8,601,178 B2 | 12/2013 | Amini et al. | |
| 9,509,798 B1* | 11/2016 | Thomas | H04L 67/32 |
| 2002/0038240 A1* | 3/2002 | Kondo | G06Q 30/02 705/14.51 |
| 2005/0002345 A1* | 1/2005 | Pyo | H04W 84/08 370/311 |
| 2005/0065961 A1* | 3/2005 | Aguren | G06F 17/30067 |
| 2005/0108747 A1* | 5/2005 | Omoigui | H04L 29/06 725/32 |
| 2006/0281541 A1* | 12/2006 | Nguyen | G07F 17/32 463/25 |
| 2007/0077992 A1* | 4/2007 | Midgley | A63F 13/12 463/42 |
| 2007/0117635 A1* | 5/2007 | Spanton | A63F 13/12 463/43 |
| 2007/0140467 A1* | 6/2007 | McCormack | G06Q 10/10 379/265.05 |
| 2008/0026845 A1* | 1/2008 | Aguilar | A63F 13/12 463/42 |
| 2008/0096664 A1* | 4/2008 | Baray | A63F 13/12 463/42 |
| 2008/0162387 A1* | 7/2008 | Singh | G06Q 30/02 706/14 |
| 2008/0201225 A1* | 8/2008 | Maharajh | G06F 17/30035 705/14.43 |
| 2008/0209441 A1* | 8/2008 | Septon | G06Q 30/02 719/318 |
| 2009/0125550 A1 | 5/2009 | Barga et al. | |
| 2009/0228563 A1 | 9/2009 | Jones et al. | |
| 2009/0249387 A1* | 10/2009 | Magdy | G06F 17/30787 725/32 |
| 2009/0319916 A1* | 12/2009 | Gudipaty | G06Q 10/109 715/753 |
| 2010/0122305 A1* | 5/2010 | Moloney | G06F 21/10 725/93 |
| 2011/0022653 A1* | 1/2011 | Werth | H04L 67/34 709/202 |
| 2011/0125846 A1* | 5/2011 | Ham | H04L 12/1859 709/204 |
| 2011/0276396 A1* | 11/2011 | Rathod | G06F 17/30867 705/14.49 |
| 2011/0289422 A1* | 11/2011 | Spivack | G06Q 30/02 715/739 |
| 2012/0030292 A1* | 2/2012 | John | G06F 17/30023 709/206 |
| 2012/0137018 A1 | 5/2012 | Uhlig et al. | |
| 2012/0222077 A1* | 8/2012 | Putnam | H04L 65/1076 725/109 |
| 2012/0246301 A1* | 9/2012 | Vyrros | H04L 45/745 709/224 |
| 2012/0278428 A1* | 11/2012 | Harrison | H04N 21/2665 709/217 |
| 2012/0291056 A1* | 11/2012 | Donoghue | H04N 21/26258 725/5 |
| 2012/0331502 A1* | 12/2012 | McIntire | H04N 21/25891 725/32 |
| 2013/0046856 A1* | 2/2013 | Joong | H04N 21/4316 709/219 |
| 2013/0064527 A1* | 3/2013 | Maharajh | G06F 17/30035 386/343 |
| 2013/0121527 A1* | 5/2013 | Chambers | G08B 13/19613 382/103 |
| 2013/0166580 A1* | 6/2013 | Maharajh | H04L 65/605 707/758 |
| 2013/0247120 A1* | 9/2013 | Milgramm | H04N 21/2187 725/110 |
| 2013/0311180 A1* | 11/2013 | Arnison | G06F 3/16 704/235 |
| 2013/0321388 A1* | 12/2013 | Locke | G06F 17/30867 345/418 |
| 2013/0324257 A1* | 12/2013 | Mizuki | G06F 17/30283 463/42 |
| 2014/0143004 A1* | 5/2014 | Abhyanker | G06Q 10/087 705/7.19 |
| 2014/0143333 A1* | 5/2014 | Dodge | H04L 67/22 709/204 |
| 2014/0179412 A1* | 6/2014 | Seabolt | A63F 13/12 463/25 |
| 2014/0237079 A1* | 8/2014 | Lockerbie | H04N 21/2146 709/218 |
| 2014/0244407 A1* | 8/2014 | Brown | G06Q 30/0277 705/14.73 |
| 2014/0282705 A1* | 9/2014 | Chatterjee | H04N 21/4882 725/33 |
| 2014/0344446 A1* | 11/2014 | Rjeili | H04L 43/04 709/224 |
| 2015/0074191 A1* | 3/2015 | Feng | H04L 67/26 709/204 |
| 2015/0121437 A1* | 4/2015 | Tan | H04N 21/2187 725/93 |
| 2015/0174486 A1* | 6/2015 | Brunn | A63F 13/795 3/795 |
| 2015/0231505 A1* | 8/2015 | Imai | A63F 13/71 463/29 |
| 2015/0312414 A1* | 10/2015 | Tuchman | H04M 3/5233 379/265.09 |
| 2016/0014222 A1* | 1/2016 | Chen | G06Q 10/00 709/204 |
| 2016/0043924 A1* | 2/2016 | Cejnar | G06F 11/3006 709/224 |
| 2017/0001111 A1* | 1/2017 | Willette | A63F 13/85 |

FOREIGN PATENT DOCUMENTS

| | | |
|---|---|---|
| CN | 103891249 A | 6/2014 |
| RU | 2011108549 A | 9/2012 |

OTHER PUBLICATIONS

Kiss, R. "Using Azure Lease Blob", Published on: Jun. 9, 2013, Available at: http://www.codeproject.com/Articles/596821/Using-Azure-Lease-Blob, 25pp.

Shiva, F., "Application of a Temporal Database Framework for Processing Event Queries", Jul. 2011, Proposal for Research in Partial Fulfillment, Doctor of Philosophy, Arizona State University, 67 pp.

"Event Processing with Esper and NEsper", Retrieved on: Feb. 20, 2014, Available at: http://esper.codehaus.org/, 4pp.

(56) References Cited

OTHER PUBLICATIONS

Schultz-Moller et al., "Distributed Complex Event Processing with Query Rewriting", Jul. 6, 2009, In Proceedings of the Third ACM International Conference on Distributed Event-Based Systems, 12 pp.
Zhou et al., "Rethinking the Design of Distributed Stream Processing Systems", Apr. 7, 2008, In IEEE 24th International Conference on Data Engineering Workshop, 2008, 6 pp.
Clark, C., "Streaming Map/Reduce on Wall Street", Retrieved on: Feb. 20, 2014, Available at: http://clark.ws/2013/11/19/streaming-mapreduce-on-wall-street/, 16pp.
Papaemmanouil et al, "XFlow: Internet-Scale Distributed Stream Processing", Oct. 19, 2003, In Proceedings of the 19th ACM Symposium on Operating Systems Principles, 15 pp.
"Virtualized Components in Computing Systems," Filed on Mar. 27, 2014, U.S. Appl. No. 14/228,129, Inventor(s): Gabriel Kliot.
The PCT Written Opinion of the International Preliminary Examining Authority dated May 17, 2016 for PCT application No. PCT/US2015/039170, 8 pages.
"International Preliminary Report on Patentability Issued in PCT Application No. PCT/US2015/039170", dated Aug. 26, 2016, 9 Pages.
"Office Action and Search report Issued in Russian Patent Application No. 2016151677", dated Feb. 7, 2019, 7 Pages. (w/o English Translation).
"First Office Action and Search Report Issued in Chinese Patent Application No. 201580037434.1", dated Nov. 12, 2019, 18 Pages.

\* cited by examiner

STREAM PROCESSING UTILIZING VIRTUAL PROCESSING AGENTS

BACKGROUND

In a stream processing system, a stream processing unit may communicate with other processing units to receive events for processing. This may be done through either a direct communication from one processing unit with another or through a publication-subscription model where a processing unit subscribes to certain events and receives the events when they are published.

As the scale of a stream processing system increases, e.g., where millions of processing units are involved, it may be impractical to utilize direct communication techniques between processing units. While the publication-subscription model might seem feasible, the traditional publication-subscription model requires a processing unit to explicitly submit event subscriptions before receiving any information related to the events. This may be a problem because, in some cases, it may be impossible for a processing unit to predict what events to subscribe to before certain events occur. For example, a processing unit configured to process events occurring on a map of a game application does not know which game to subscribe to until a game has started on that map. In such situations, in order for the processing unit to receive the events it is interested in, the processing unit has to subscribe to all possible events, which again becomes impractical and inefficient in a large-scale stream processing system.

It is with respect to these and other considerations that the disclosure made herein is presented.

SUMMARY

Technologies are described herein for event delivery and stream processing utilizing virtual processing agents. One or more virtual processing agents might be created and configured to receive and process stream events. A mechanism, such as a queue, might be utilized and/or configured to receive event publications from various entities in a stream processing system. The published events might also be persisted or stored for later retrieval and delivery when needed. Upon receiving an event publication, a runtime system might identify one or more virtual processing agents that might be interested in receiving the published events, but have not explicitly subscribed to the published event. Event information of the published event may then be delivered to the identified virtual processing agents. Prior to the actual delivery of the event or event information, the runtime system may further determine if the virtual processing agents have been activated, and the runtime system may activate the processing agents if the processing agents have not been activated. The event or event information contained therein may then be delivered to the activated processing agents.

Based on the received event or event information, the virtual processing agents might decide to explicitly submit subscriptions to receive more events from the queue. The explicit subscriptions might then trigger the subscribed events to be delivered to the processing agents, which might include past events that have been published in the queue before the explicit subscription is submitted. By utilizing the techniques described herein, a virtual processing agent may be able to subscribe, receive and process events that the processing agent might not otherwise know about before the event is published in the queue. By utilizing virtual processing agents to subscribe, receive and process events, the scalability, reliability and flexibility of computing resources may be improved.

It should be further appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
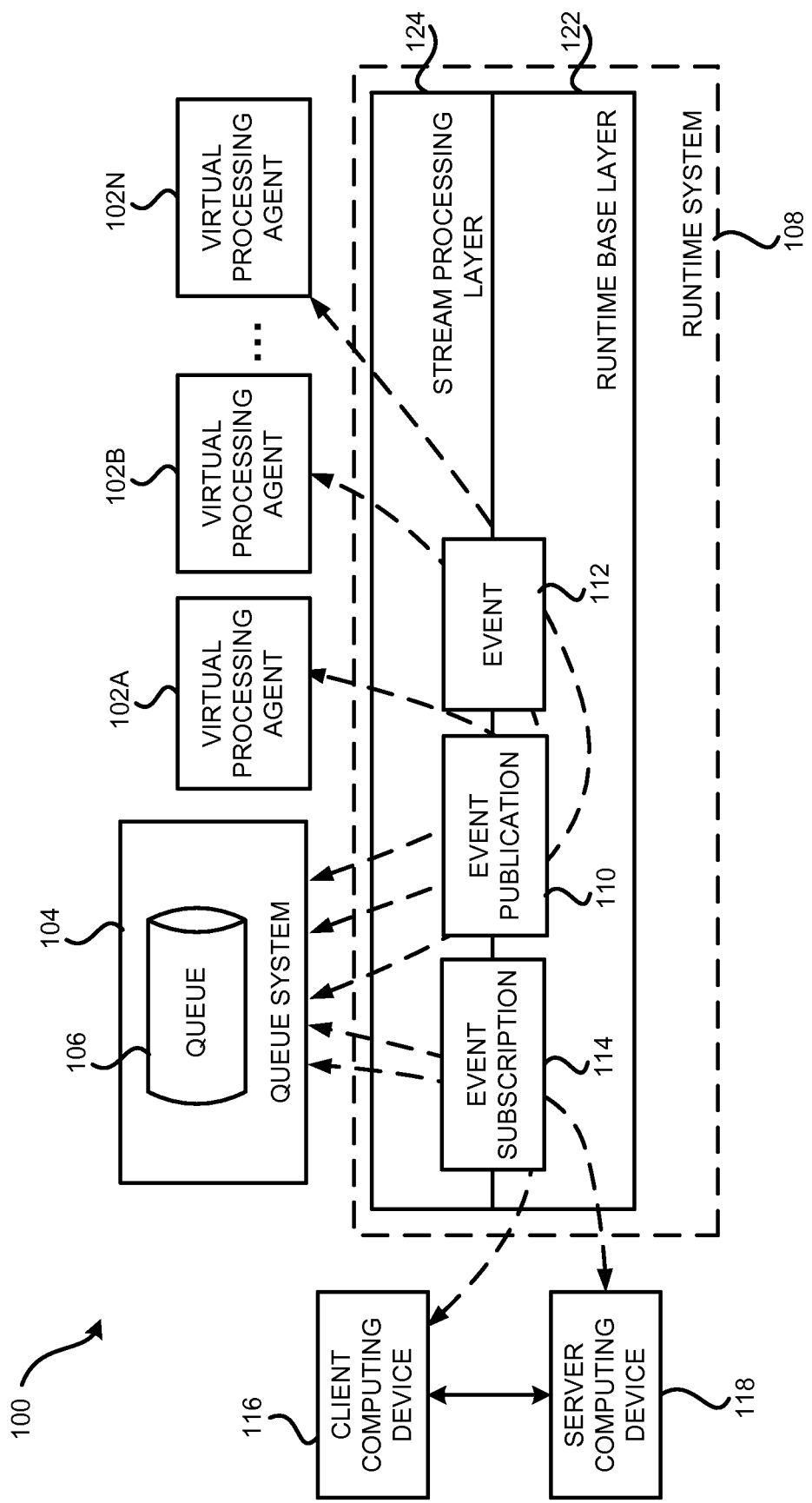
FIG. 1 is a computer system diagram providing an overview description of one mechanism disclosed herein for stream processing utilizing virtual processing agents.

Technologies are described herein for event delivery and stream processing utilizing virtual processing agents. In technologies disclosed herein, one or more virtual processing agents, which may be referred to herein as "processing agents" or "PAs," may be employed as processing units for stream processing. These virtual processing agents might execute on one or more servers, and may be addressable for operations and interactions independent of whether the processing agents are activated or not activated. Each of the virtual processing agents may be configured to publish, receive, and/or process various events. Events may be published in a queue, and may further be persisted or stored in the queue for later retrieval.

Once a publication of an event is received in the queue, one or more processing agents may be identified to receive the published events. The identified processing agents may include processing agents that have not explicitly subscribed to receive the published event, referred to herein as "implicit subscriber processing agents" or "implicit subscribers." The identification of an implicit subscriber may be performed based on the settings or configurations of the virtual processing agent, including, but not limited to, the actions to be performed by the virtual processing agent, the input and output of the virtual processing agent, the status of the virtual processing agent, and potentially other configurations of the virtual processing agent. The configurations of the virtual processing agent may be derived from a declarative definition of the processing agent, or obtained programmatically.

The published event or the information contained within or associated with the published event, referred to herein as "event information," may then be delivered to the identified implicit subscriber processing agents. Prior to the actual delivery, a runtime system that supports and manages the virtual processing agents may determine if the implicit subscriber processing agents have been activated, and may activate the processing agents if the processing agents have not been activated. The event or the event information may then be delivered to the activated processing agents where the event or the event information may be further processed. Similarly, when the event publication is received at the queue, one or more processing agents that have explicitly subscribed to receive the published event might also be identified and activated if needed. The published event may then be delivered to the explicit subscriber processing agents for processing.

Based on the received event or event information, an implicit subscriber processing agent might decide that further events are needed for processing and may in turn submit explicit subscriptions to receive those events when they are published in the queue. Depending on the configurations of the processing agent, events specified in the explicit subscription may include past events that have already occurred and published in the queue. In such a scenario, since the events published in the queue might have been persisted or stored, the queue may retrieve and deliver those subscribed past events to the processing agent. The queue might further deliver subscribed events to the processing agent as more events are published in the queue.

According to further aspects, events in the queue may be mapped to or abstracted into one or more virtual streams, and each of the virtual streams might include a subset of events that are published in the queue. The event publication and event subscription performed by the processing agent, and/or other entities, may be directed to the virtual streams rather than the queue. Each of the virtual streams may be defined by the events to be published therein and/or by the type of events that a processing agent is interested in receiving. As such, the virtual streams might be dynamic, and the existence of the virtual streams might depend on the events to be published and/or events to be delivered. Additional details regarding these and other aspects of the technologies presented herein will be provided below with regard to FIGS. 1-6.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific aspects or examples. Referring now to the drawings, in which like numerals represent like elements throughout the several figures, aspects of a computing system and methodology for subscribing, receiving and processing events will be described.

Turning now to FIG. 1, details will be provided regarding a computer system and several components included therein according to aspects presented herein. In particular, FIG. 1 shows aspects of a stream processing system 100 for event delivery and stream processing utilizing virtual processing agents. As shown in FIG. 1, the stream processing system 100 might include a runtime system 108 that supports and facilitates the communication among various entities in the stream processing system 100, including, but not limited to, virtual processing agents 102A-102N (which may be referred to herein individually as a virtual processing agent 102 or collectively as the virtual processing agents 102), a queue system 104, a client computing device 116, and a server computing device 118.

The runtime system 108 might include a group of distributed servers (not shown in FIG. 1) that may be configured to execute a runtime base layer 122 to collectively provide and support "virtualized distributed components" (which may also be referred to herein as "virtual components"). As used herein, "components" refers to software components such as software objects or other kinds of individually addressable isolated entities, such as distributed objects, agents, actors and the like. A virtualized distributed component supported by the runtime system 108 has an existence that is independent of the lifetime of any of its in-memory instantiations, and thus independent of the lifetime of any particular server in the runtime system 108. If there is no in-memory instance of a virtual component, a message sent to the component automatically causes a new instance to be created on an available server by the runtime base layer 122, which may be any available server in the runtime system 108. As such, a virtual component is always addressable by an identity of the virtual component for interaction and/or operation independent of whether the virtual component is activated in the system or not.

The runtime base layer 122 may also be configured to manage virtual component activation and deactivation. The runtime base layer 122 may be further configured to manage communications to virtual components transparent to a program that uses the virtual component. To achieve this, the runtime base layer 122 may maintain information that indicates one or more server locations for any activated instance of the virtual component, send one or more communications to an activated virtual component instance, or preserve communications to a virtual component that is in a deactivated state until an instance of the virtual component is activated into an activation for receiving the communications thereto. The runtime base layer 122 thus might give a developer a virtual "component space" that allows invoking any possible virtual component in the system as if it were activated, i.e., present in memory.

If a server on which a virtual component is activated crashes, the virtual component may be recovered by reactivating another activation of the virtual component on another server in the runtime system 108. As such, virtual components do not need to be supervised and/or explicitly recreated by an application that is developed based on the runtime base layer 122.

The virtualization of components is based upon a level of indirection that maps from virtual components to physical instantiations/activations that are currently running. This level of indirection may provide the runtime base layer 122 with the opportunity to handle many problems that would otherwise need to be addressed by the application developer, such as virtual component placement and load balancing, deactivation of unused virtual components, and virtual component recovery after server failures. Thus, the virtual components provided by the runtime base layer 122 may simplify the programming model while allowing the runtime flexibility in balancing load and transparently recovering from failures. More details on runtime base layer 122 can be found in co-pending U.S. patent application Ser. No. 14/228,129, filed on Mar. 26, 2014, and entitled "Virtualized Components in Computing Systems," which is expressly incorporated herein by reference in its entirety.

According to aspects of technologies presented herein, the virtual processing agents 102 in the stream processing system 100 may be constructed as virtual components provided and supported by the runtime base layer 122 of the runtime system 108. Based on such a construction, the virtual processing agents 102 may be always addressable for interaction and/or operation independent of whether the virtual processing agents 102 are activated or not. The virtual processing agents 102 may be recovered after failure of a server on which the virtual processing agent 102 was activated by reactivating the virtual processing agent 102 on another server in the runtime system 108.

In some aspects, the virtual processing agents 102 may each be configured to implement certain actions and may collectively provide functionality for a large-scale software application. For example, in a computer game application, a virtual processing agent 102 may be created for and configured to manage each game in the game application. A virtual processing agent 102 may also be created for each map that hosts a game in the game application. Separate virtual processing agents 102 may further be created and configured to manage individual players who participate in various games of the game application. Configurations of a virtual processing agent 102, including the actions to be performed by the virtual processing agent 102, the input and output of the virtual processing agent 102, and/or other configurations, may be specified through a declarative definition of the virtual processing agent 102 or may be obtained programmatically.

In order to provide a coherent system for stream processing, the various virtual processing agents 102 in the stream processing system 100 might need to communicate with each other. For example, a message may be communicated from one virtual processing agent 102 to another to update the status of the virtual processing agents 102, to activate the other virtual processing agent 102, and/or to trigger certain actions to be performed by the other virtual processing agent 102. According to some aspects described herein, the message from a virtual processing agent 102 intended to be communicated to other virtual processing agents 102 and/or another entity in a system may be published as an event 112 in a queue 106 implemented by the queue system 104.

The queue system 104 may include one or more servers implementing a queue 106 for receiving and persisting event publications from various entities in the stream processing system 100. It should be understood that the servers in the queue system 104 and the runtime system 108 may include the same or different servers, and the servers in the queue system 104 and the runtime system 108 may be web servers, application servers, network appliances, dedicated computer hardware devices, personal computers ("PC"), or any combination of these and/or other computing devices known in the art. The servers may be connected through a network (not shown in FIG. 1), that may be a local-area network ("LAN"), a wide-area network ("WAN"), the Internet, or any other networking topology known in the art that connects computing devices.

The event 112 to be published in the queue 106 might include various information associated with an event that has occurred or been observed at the event sending entity which might be a virtual processing agent 102, a client computing device 116, a server computing device 118, and/or potentially other entities in the stream processing system 100. The information contained in an event 112 may include, but is not limited to, an identification of the entity where the event originated, the time of the event, the location of the event, identifications of entities involved in the event, and/or other information that might be used to describe the event. The event 112 may be published in the queue 106 by sending an event publication 110 through the runtime system 108. The event publication 110 may include all the information contained in the corresponding event 112 with additional information such as an indication that the event is for publication, data specifying where and when the event 112 should be published, and the like. In further aspects, the queue system 104 may also persist or store the published events 112 in the queue 106 or in other storage locations that are accessible to the queue system 104 and/or to the runtime system 108.

In order to receive events for processing from other virtual processing agents 102 and/or other event originating entities in the stream processing system 100, a virtual processing agent 102 may send one or more event subscriptions 114 to subscribe to receive events that are published in the queue 106. Such a virtual processing agent 102 may be referred to herein as an "explicit subscriber processing agent 102" or an "explicit subscriber 102" of those events. By way of example, and not limitation, an event subscription 114 may contain data that specifies the type or the content of the events that the subscribing virtual processing agent 102 is interested in receiving. The event subscription 114 may also specify a time period during which the subscribed events should occur. The event subscription 114 might further specify one or more predicates or rules that may be utilized to filter events to be delivered to the virtual processing agent 102. It should be understood that various other data describing the events that a virtual processing agent 102 is interested in receiving may also be included in the event subscription 114.

As will be discussed in more detail below, the runtime system 108 may also be configured to execute a stream processing layer 124, which may be referred to herein as the "stream processing layer 124," or the "runtime stream processing layer 124." The runtime stream processing layer 124 may be configured to manage event communications among the entities in the stream processing system 100, including, but not limited to, managing event publications 110 in the queue 106, coordinating the delivery of events 112 to virtual processing agents 102 and/or other event subscribers, receiving and processing event subscriptions 114, and potentially other operations.

The runtime stream processing layer 124 might receive the event subscriptions 114 from one or more explicit subscriber processing agents 102, and send subscribed events 112 to the corresponding explicit subscriber processing agents 102 when the subscribed events 112 are published in the queue 106. According to further aspects, the runtime stream processing layer 124 may further send a published event 112 or event information contained in the event 112 to one or more virtual processing agents 102 that have not explicitly subscribed to the events 112, but might be interested in receiving the information contained in the published events 112, which are referred to herein as "implicit subscriber processing agents 102" or "implicit subscriber 102" of the published events 112.

An implicit subscriber processing agent 102 may be identified through examining configurations or settings of the virtual processing agent 102, such as the actions to be performed by the virtual processing agent 102, the input and output of the virtual processing agent 102, the status of the virtual processing agent 102, and/or other configurations of the virtual processing agent 102. For example, a virtual processing agent 102 might be identified as an implicit subscriber processing agent 102 if the actions to be performed by the virtual processing agent 102 involve an object or an entity that initiated, is mentioned, or otherwise is associated with the published event 112. A virtual processing agent 102 might also be identified as an implicit subscriber processing agent 102 if data included in the published event 112 is consumed or processed by the virtual processing agent 102. It should be understood that these examples are merely illustrative, and should not be construed as limiting. Other ways of identifying the implicit subscriber processing agent 102 may also be utilized.

Once the runtime stream processing layer 124 has identified the implicit subscriber processing agents 102, the event 112 may be delivered to the implicit subscriber processing agents 102 through the runtime base layer 122. As discussed above, the virtual processing agents 102 in the stream processing system 100 may be implemented as virtual components supported by the runtime base layer 122 of the runtime system 108. From the perspective of the runtime stream processing layer 124, the virtual processing agents 102 might be always addressable for the delivery of the events 112 independent of whether the virtual processing agents 102 are activated in the system or not. The runtime stream processing layer 124 thus may pass the event 112 to the runtime base layer 122 for delivery.

Upon receiving the event 112, the runtime base layer 122 may determine whether the implicit subscriber processing agents 102 have been activated or not, that is, whether the implicit subscriber processing agents 102 have been loaded into the memory and are ready for operation. If the implicit subscriber processing agents 102 have not been activated, the runtime base layer 122 may activate the implicit subscriber processing agents 102 and then deliver the event 112 to the activated implicit subscriber processing agents 102. Similarly, when delivering events 112 to explicit subscriber processing agents 102, the runtime base layer 122 might also determine if the explicit subscriber processing agents 102 are activated, and activate the explicit subscriber processing agents 102, if necessary, before the delivery of the events 112.

Depending on the implementation of the virtual processing agents 102 and the status of the virtual processing agents 102 when activated, some of the activated implicit subscriber processing agents 102 might not be configured to accept and process the event 112 yet. For example, the implicit subscriber processing agent 102 might not have an event handler constructed yet upon activation. In such a scenario, event information including some or all of the data contained in the event 112 may be rearranged and delivered to the implicit subscriber processing agent 102 in a format that is acceptable to the implicit subscriber processing agent 102. In other scenarios, it may be sufficient to send event information indicating the occurrence of the event 112 to the virtual processing agent 102 without sending detailed data contained in the event 112.

Based on the received event 112 or the event information, some implicit subscriber processing agents 102 might decide to submit one or more event subscriptions 114 to the runtime stream processing layer 124 to receive more events published in the queue 106 for processing. As briefly mentioned above, events contained in the explicit event subscriptions 114 submitted by the implicit subscriber processing agent 102 might include past events that have been published in the queue 106 before the event subscriptions 114 are received and processed. The runtime stream processing layer 124 may retrieve the past events from the queue or other storage where the corresponding events are persisted, and deliver the retrieved events to the implicit subscriber processing agent 102. It should be noted that when the implicit subscriber processing agent 102 submits the event subscription 114, the implicit subscriber processing agent 102 might turn into an explicit subscriber processing agent 102 for the subscribed events and may be handled in a manner similar to that described above for handling the explicit subscriber processing agent 102.

It should be further understood that while the above has primarily described that the virtual processing agent 102 may send event publications 110, submit event subscriptions 114, and/or receive events 112, various other entities in the stream processing system 100 may also perform these operations. For example, a user of a computer game application might be interested in receiving information regarding a game, such as the leader board information of the game. The user may send an event subscription 114 to the runtime system 108 to obtain such information through a client computing device 116, which might be a personal computer ("PC"), a laptop, a notebook, a personal digital assistant ("PDA"), a game console, a set-top box, an e-reader, a consumer electronics device, a smartphone, a tablet computing device, a server computer, or any other computing device capable of communicating with the runtime system 108.

Similarly, a server computing device 118, which may be server computers, web servers, application servers, network appliances, dedicated computer hardware devices, PCs, or any combination of these and/or other computing devices known in the art, and have a game executed thereon, might send an event publication 110 to publish a game start event 112 in the queue 106. The server computing device 118 might also send one or more event subscriptions 114 in order to receive events 112 that the server computing device 118 is interested in processing. Other entities in the stream processing system 100 may also be configured to publish, receive, and/or subscribe to the events 112 in a way similar to that described above.

It should also be appreciated that while FIG. 1 primarily discloses the use of the queue 106 for receiving and persisting event publications 110 from various entities in the stream processing system 100, various other mechanisms may also be utilized in a similar fashion. In fact, virtually any data structure that can store and hold data for later processing might be utilized in a similar way to that described above regarding the queue 106. It is intended that this application include all such data structures for holding and storing the event publications 110.

Figure 2:
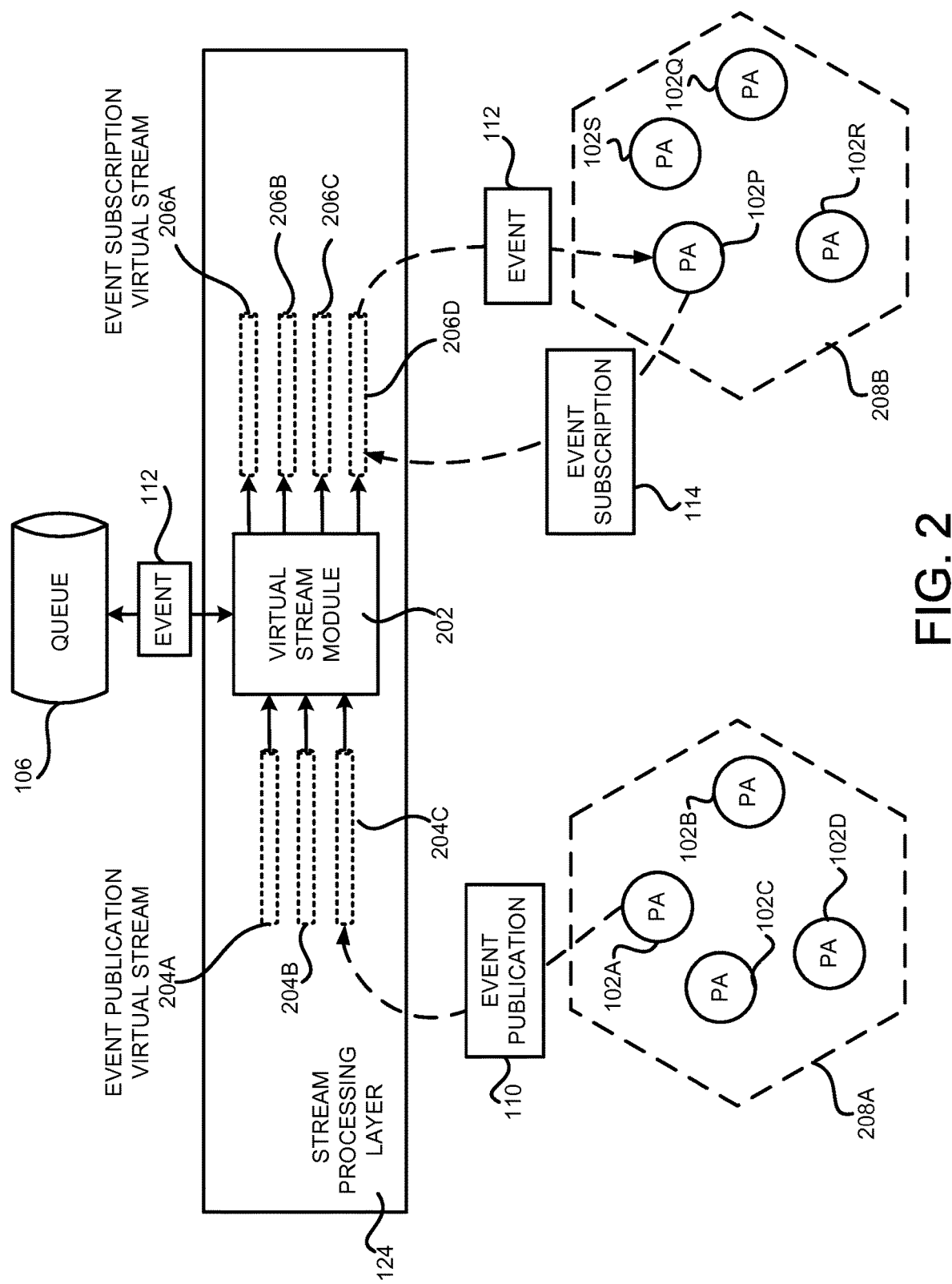
FIG. 2 is a block diagram showing aspects of a queue and virtual streams.

Referring now to FIG. 2, a block diagram showing further aspects of the queue 106 and the runtime stream processing layer 124 will be described. As briefly discussed above, the runtime stream processing layer 124 might provide and support virtual streams for processing event publications 110 and event subscriptions 114. By utilizing virtual streams, event publications 110 and event subscriptions 114 submitted by virtual processing agents 102, and/or other entities, may be directed to the virtual streams rather than the queue 106. As a result, the virtual processing agents 102 might not need to know the existence of the queue 106. FIG. 2 illustrates various virtual streams abstracted by the runtime stream processing layer 124 and the interactions among the virtual streams, the queue 106 and the virtual processing agents 102.

As shown in FIG. 2, the runtime stream processing layer 124 may include a virtual stream module 202 for providing and supporting functionality associated with virtual streams and for maintaining a mapping of the events among the queue 106 and the virtual streams. The virtual streams provided by the virtual stream module 202 might include event publication virtual streams 204A-204C (which may be referred to herein individually as an event publication virtual stream 204 or collectively as event publication virtual streams 204) and event subscription virtual streams 206A-206D (which may be referred to herein individually as an event subscription virtual stream 206 or collectively as event subscription virtual streams 206).

Each of the event publication virtual streams 204 may be defined by the events to be published therein, and each of the event subscription virtual streams 206 may be defined by the events that a subscribing entity is interested in receiving. For example, a virtual processing agent 102A might send an event publication 110 to the runtime stream processing layer 124 to publish an event 112. The event publication 110 might be sent to the runtime stream processing layer 124 through an event publication virtual stream 204C. Prior to the event publication 110 being received at the runtime stream processing layer 124, the event publication virtual stream 204C might not exist and the arrival of the event publication 110 may cause the event publication virtual stream 204C to be created. In other words, an event publication 110 or the event contained therein may define and cause the event publication virtual stream 204 where the event publication 110 is sent to come into existence. Likewise, other virtual processing agents 102 may also submit event publications 110 to their corresponding event publication virtual streams 204 to publish events. After receiving the event publications 110 through the event publication virtual streams 204, the virtual stream module 202 may send the events specified in the event publications 110 to the queue 106 for publication.

Similarly, when a virtual processing agent 102P submits an event subscription 114 indicating the events that the virtual processing agent 102P is interested in receiving, such an event subscription 114 may define an event subscription virtual stream 206D corresponding to the events specified by the event subscription 114. As a result, by submitting the event subscription 114, the virtual processing agent 102P is equivalently subscribing to the event subscription virtual stream 206D defined by the event subscription 114. It should be understood that a virtual processing agent 102 may subscribe to multiple event subscription virtual streams 206 by submitting one or multiple event subscriptions 114 to the runtime stream processing layer 124. Once the runtime stream processing layer 124 has received the event subscription 114, the event subscription virtual stream 206D may be created and come to existence. Based on the event subscription 114, the virtual stream module 202 might retrieve events 112 published in the queue 106, and push the events 112 into the event subscription virtual stream 206D, which may then be delivered to the virtual processing agent 102P.

For example, a virtual processing agent 102A might be configured to process a game, and may send an event publication 110 to the runtime stream processing layer 124 to publish an event 112 that occurred in the game. The submitted event publication 110 may cause a game event stream 204C to be created to receive the event 112 for publishing. The event 112 received through the game event stream 204C may be further sent to the queue 106 for publication and storing. In the meantime, the runtime stream processing layer 124 may have also received an event subscription 114 from the virtual processing agent 102P to subscribe to receive all the kill events in games. Such an event subscription 114 might have caused a kill event stream 206D be created.

Upon receiving the event publication 110 in the game event stream 204C, the virtual stream module 202 might detect that kill events, if there are any, published through the game event stream 204C should be forwarded to the kill event stream 206D for delivery to the virtual processing agent 102P. The detection may be performed by, for example, utilizing the mapping of events in the queue 106 and in the virtual streams maintained by the virtual stream module 202 as discussed above. Subsequently, for each kill event 112 published through the game event stream 204C, the virtual stream module 202 may retrieve the kill event 112 from the queue 106 and push it to the kill event stream 206D for delivery to virtual processing agent 102P. It should be appreciated that the above example is merely illustrative, and various other events 112, event publications 110, event subscriptions 114 and/or other data may be communicated among the virtual processing agents 102 and the queue 106 through the virtual streams 204 and 206, and/or the runtime stream processing layer 124.

According to further aspects, the event subscription 114 submitted by a virtual processing agent 102 may further specify one or more predicates that may be utilized to further define the corresponding event subscription virtual stream 206. The predicates may be processed at the proper time by the runtime stream processing layer 124 to refine the event subscription virtual stream 206, such as to create one or more filters that can be utilized to filter the events pushed to the event subscription virtual stream 206. Utilizing the predicates, the events sent to the virtual processing agent 102 may be further refined and thus eliminate the delivery of unneeded events to the virtual processing agent 102.

As can be seen from the above, the virtual streams 204 and 206 are highly dynamic and flexible, and may be created whenever needed, thereby significantly increasing the scalability of the stream processing system 100. According to further aspects, the virtual streams 204 and 206 may logically exist all the time, but the system resources are allocated to them only when there are events in the virtual streams 204 and 206 to process. The virtual streams 204 and 206 may be deactivated by reclaiming their resources when no events are received in the virtual streams 204 and 206 over a certain period of time. This period of time may be pre-determined or dynamically adjusted according to the status of the system, such as the usage of the system resources. Such an implementation may be advantageous in scenarios when virtual streams are built with a fine granularity. For example, virtual streams in an application system may be constructed on a per-user basis, a per-device basis, and/or a per-session basis. In a large application system, the number of users, devices and/or session, and thus the number of virtual streams, may be at the scale of hundreds of millions or even billions. Events associated with those virtual streams, however, may only occur infrequently and/or in bursts, and at one moment, only a small portion of the virtual streams may need to be active. In such a system, by allocating resources to virtual streams only when there are events in the virtual streams 204 and 206 to process may significantly increase the efficiency and the scalability of the system.

Furthermore, the virtual stream module 202 may be further configured to aggregate the communications to and from the virtual processing agents 102 before interacting with the queue 106. For example, the virtual stream module 202 might receive multiple event publications 110 from multiple virtual processing agents 102. These multiple event publications 110 may be aggregated through, for example, multiplexing, and communicated to the queue 106 to publish the multiple events 112 through a single communication connection. Likewise, multiple event subscriptions 114 received from multiple virtual processing agents 102 may be processed and aggregated, and the events 112 to be sent to the multiple virtual processing agents 102 might be retrieved from the queue 106 also through a single communication connection with the queue 106.

It should be appreciated that while the above examples have described that multiple communications are aggregated and communicated to the queue 106 through a single communication connection, it should be understood that more than one communication connection may be established between the runtime stream processing layer 124 and the queue 106 for communication. The number of established communication connections, however, may be much smaller than the number of communication requests, such as the event publications 110, and/or the event subscriptions 114, from the virtual processing agents 102. The advantage of the communication aggregation may become more significant as the scale of the stream processing system 100 increases. For instance, for a stream processing system 100 with millions of virtual processing agents 102, the communication requests from the virtual processing agents 102 might be at the scale of tens of millions, and it is typically impractical for a queue 106 to establish such a large number of direct TCP/IP connections with each of the virtual processing agents 102. Through communication aggregation, the virtual stream module 202 may reduce the number of direct TCP/IP connections to the queue 106 to several thousands, thereby substantially reducing the consumption of communication resources.

It should be further appreciated that while FIGS. 1 and 2 illustrate that one queue 106 is utilized for publishing and persisting the events 112, multiple queues 106 may be employed. In such implementations, the virtual stream module 202 may be further configured to manage the multiple queues 106 and maintain a mapping of events among the queues 106 and the various virtual streams 204 and 206. It should also be understood that other entities in the stream processing system 100, such as the client computing device and the server computing device, may also publish events via event publications 110, submit event subscriptions 114, and/or receive events 112 through the virtual streams 204 and 206.

FIG. 2 further illustrates aspects for organizing and managing virtual processing agents 102 utilizing processing agent containers 208A-208B (which may be referred to herein individually as a processing agent container 208 or collectively as the processing agent containers 208). Each of the processing agent containers 208 might provide an independent computing environment to the virtual processing agents 102 that is separated and isolated from other processing agent containers 208. Various computing resources, such as virtual machines, may be allocated to a processing agent container 208 to host the virtual processing agents 102. Each processing agent container 208 may also scale independently from other processing agent containers 208. It should be understood that the virtual processing agent 102 that publishes an event 112 and the virtual processing agent 102 that subscribes to and receives the event 112 may be in a same processing agent container 208 or in two different processing agent containers 208. It should be further understood that the virtual processing agents 102 may be organized and managed in various other ways that do not involve the use of the processing agent containers 208.

Figure 3:
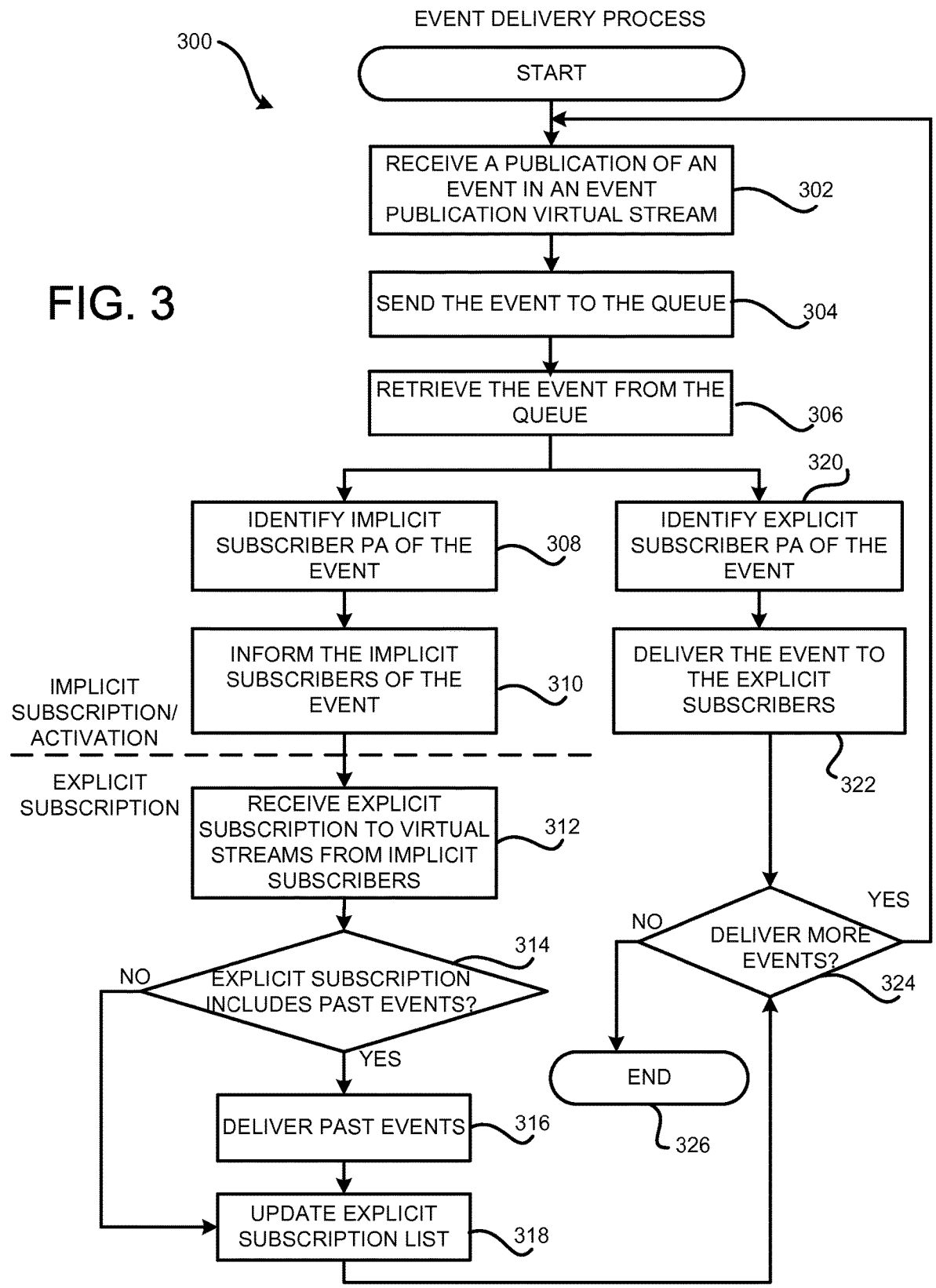
FIG. 3 is a flow diagram showing further aspects of one illustrative process for delivering events to virtual processing agents.

FIG. 3 is a flow diagram illustrating aspects of one illustrative routine 300 for delivering events to virtual processing agents 102. In some implementations, the routine 300 is performed by the runtime stream processing layer 124 of the runtime system 108 described above in regard to FIG. 1. It should be appreciated, however, that the routine 300 might also be performed by other modules and/or components of the runtime system 108 or by modules and/or components of other entities in the stream processing system 100 illustrated in FIG. 1.

It should be appreciated that the logical operations described herein with respect to FIG. 3 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein. It also should be understood that each of the illustrated methods can be ended at any time and need not be performed in its entirety.

Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The routine 300 begins at operation 302 where the stream processing layer 124 of the runtime system 108 might receive an event publication 110 in a corresponding event publication virtual stream 204. As discussed above, the event publication virtual stream 204 may be dynamically created based on the received event publication 110. The routine 300 then proceeds to operation 304 where the runtime stream processing layer 124 sends the event 112 specified in the event publication 110 to the queue 106 for publication. The runtime stream processing layer 124 may further instruct the queue 106 to persist or store the event 112 in the queue 106 so that the event 112 may be retrieved later. In some implementations, the event 112 may also be persisted or stored in a storage device that is accessible to the queue 106 and/or to the runtime stream processing layer 124.

From operation 304, the routine 300 proceeds to operation 306 where the runtime stream processing layer 124 might retrieve the event 112 from the queue 106, and the routine 300 further proceeds to operation 308 where implicit subscriber processing agents 102 based on the event 112 may be identified. As noted above, an implicit subscriber processing agent 102 is a virtual processing agent 102 that has not explicitly subscribed to the event 112, but might be interested in receiving the information contained in the published event 112. The implicit subscriber processing agent 102 may be identified through examining configurations or settings of the virtual processing agent 102, such as the actions to be performed by the virtual processing agent 102, the input and output of the virtual processing agent 102, the status of the virtual processing agent 102, and/or other configurations of the virtual processing agent 102. For example, a virtual processing agent 102 might be identified as an implicit subscriber processing agent 102 if the actions to be performed by the virtual processing agent 102 involve an object or an entity that initiated, is mentioned, or otherwise is associated with the published event 112. A virtual processing agent 102 might also be identified as an implicit subscriber processing agent 102 if data included in the published event 112 is consumed or processed by the virtual processing agent 102.

Figure 6:
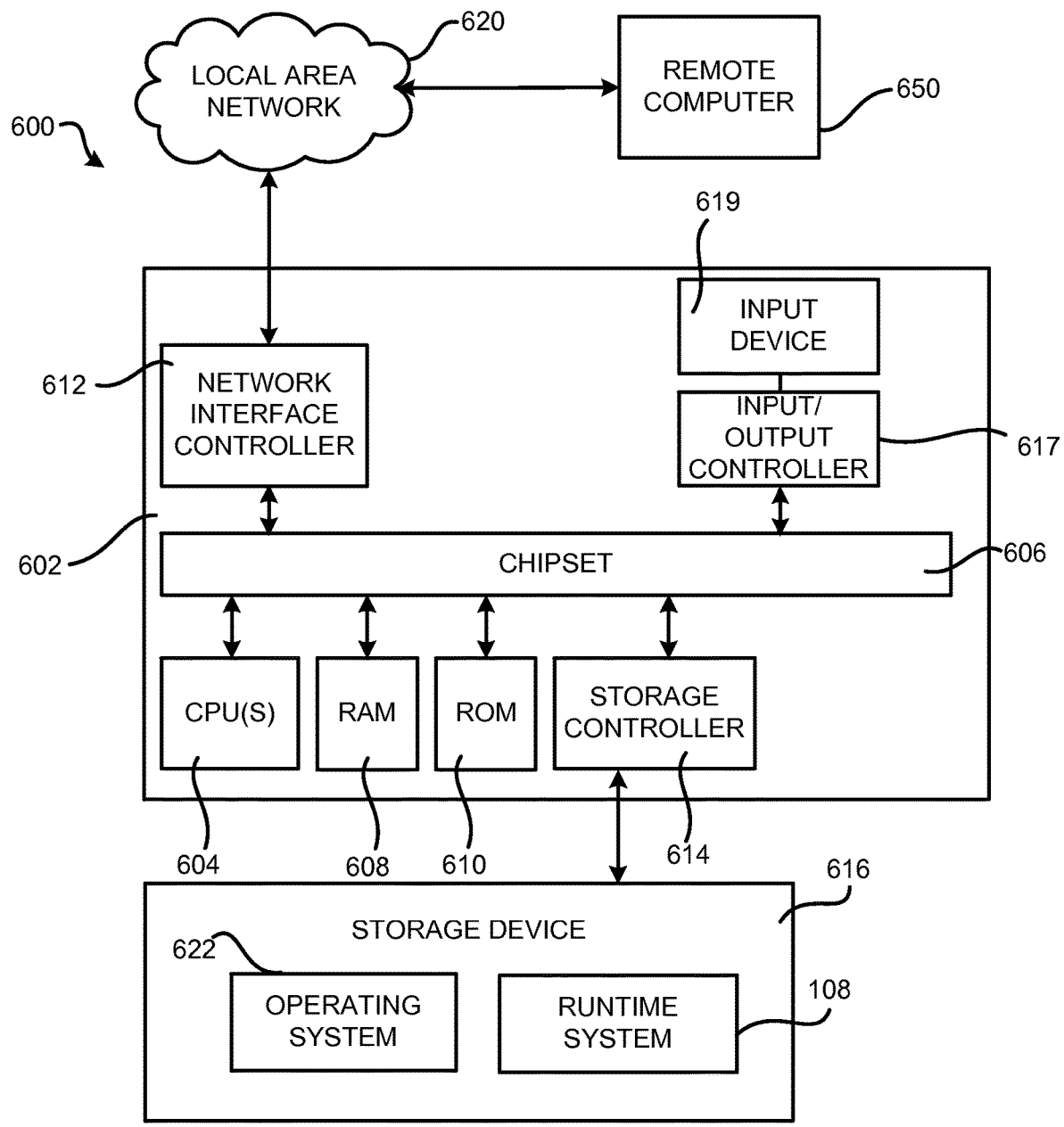
FIG. 6 is a computer architecture diagram showing an illustrative computer hardware architecture for a computing system capable of implementing the technologies presented herein.

In some implementations, the runtime stream processing layer 124 might maintain an implicit activation table that maps different types of events or the corresponding event subscription virtual streams 206 to one or more implicit subscriber processing agents 102. An example implicit activation table is shown in FIG. 6 and will be described later. The implicit activation table might be pre-generated and looked up by the runtime stream processing layer 124 when needed. The implicit activation table might also be realized through a function or a module executing in the runtime stream processing layer 124 that may output one or more implicit subscriber processing agents 102 for a given event or event information. It should be noted that the implicit activation table may be implemented in other ways by following the same principles described above.

From operation 308, the routine 300 proceeds to operation 310, where the implicit subscriber processing agents 102 identified in operation 308 may be informed of the event 112, for example, by sending the event 112 or event information of the event 112 to the implicit subscriber processing agents 102. As mentioned above, the event information may contain information contained within or associated with the event 112. Depending on the nature of the implicit subscriber processing agents 102, the event information sent to some implicit subscriber processing agents 102 may contain a portion or all of the data contained in the event 112. For other implicit subscriber processing agents 102, the event information may only contain an indication of the existence of the event 112. As will be discussed in detail with regard to FIG. 4, based on the received event 112 or the event information, the implicit subscriber processing agents 102 may decide whether to subscribe to receive more events and/or to perform further operations.

From operation 310, the routine 300 proceeds to operation 312, where the runtime stream processing layer 124 might receive event subscriptions 114 from one or more of the implicit subscriber processing agents 102 to subscribe to the corresponding event subscription virtual streams 206. The routine 300 then proceeds to operation 314 where the runtime stream processing layer 124 may determine whether events specified in the explicit event subscriptions 114 include past events that have already occurred and been published in the queue 106. If it is determined that the explicit event subscriptions 114 include past events, the routine 300 proceeds to operation 316 where the runtime stream processing layer 124 may retrieve the past events from the queue 106 and/or other storage devices that store the past events, and deliver the retrieved past events to the corresponding virtual processing agents 102.

From operation 316, or if it is determined at operation 314 that the explicit event subscriptions 114 do not include past events, the routine 300 proceeds to operation 318, where the runtime stream processing layer 124 may update the explicit subscriptions it maintains and/or perform other operations based on the received explicit event subscriptions 114, such as updating mapping of events in the event publication virtual streams 204, the event subscription virtual streams 206, and the queue 106.

From operation 306, the routine 300 may also proceed to operation 320. At operation 320, the runtime stream processing layer 124 may identify one or more explicit subscriber processing agents 102 based on the event subscriptions 114 previously submitted by the virtual processing agents 102. The routine 300 may further proceed to operation 322 where the event 112 may be delivered to the explicit subscriber processing agents 102. From operation 318 or operation 322, the routine 300 proceeds to operation 324 where it may be determined whether the runtime stream processing layer 124 needs to deliver more events. If the runtime stream processing layer 124 needs to deliver more events, the routine 300 returns to operation 302 to receive more event publications 110 for processing and delivery. Otherwise, the routine 300 proceeds to operation 326, where the routine 300 ends.

It should appreciated that in the above-described event delivery process, when delivering the event 112 to explicit subscriber processing agents 102 and/or when sending event 112 or event information to the implicit subscriber processing agents 102, the runtime base layer 122 may first determine whether the corresponding processing agents 102 have been activated. If there are any processing agents 102 that have not been activated, the runtime base layer 122 may activate the processing agents 102, and then deliver the event 112 or the event information to the activated processing agents 102.

In this regard, a processing agent 102, such as the implicit subscriber processing agent 102, may be activated dynamically including allocating system resources upon arrival of a first event 112 in a stream 206 that the processing agent 102 is responsible for processing of Thus, system resources, such as memory and CPU, may not need to be allocated to the processing agent 102 before the first event 112 arrives. Likewise, when the processing agent 102 becomes idle for a given period of time, for example, because no events 112 are received for processing from the streams 206 that the processing agent 102 is subscribed to, the processing agent 102 may be transparently deactivated to reclaim its system resources. The given period of time for deactivating the processing agent 102 may be pre-determined or dynamically adjusted according to the status of the system, such as the usage of the system resources.

Figure 4:
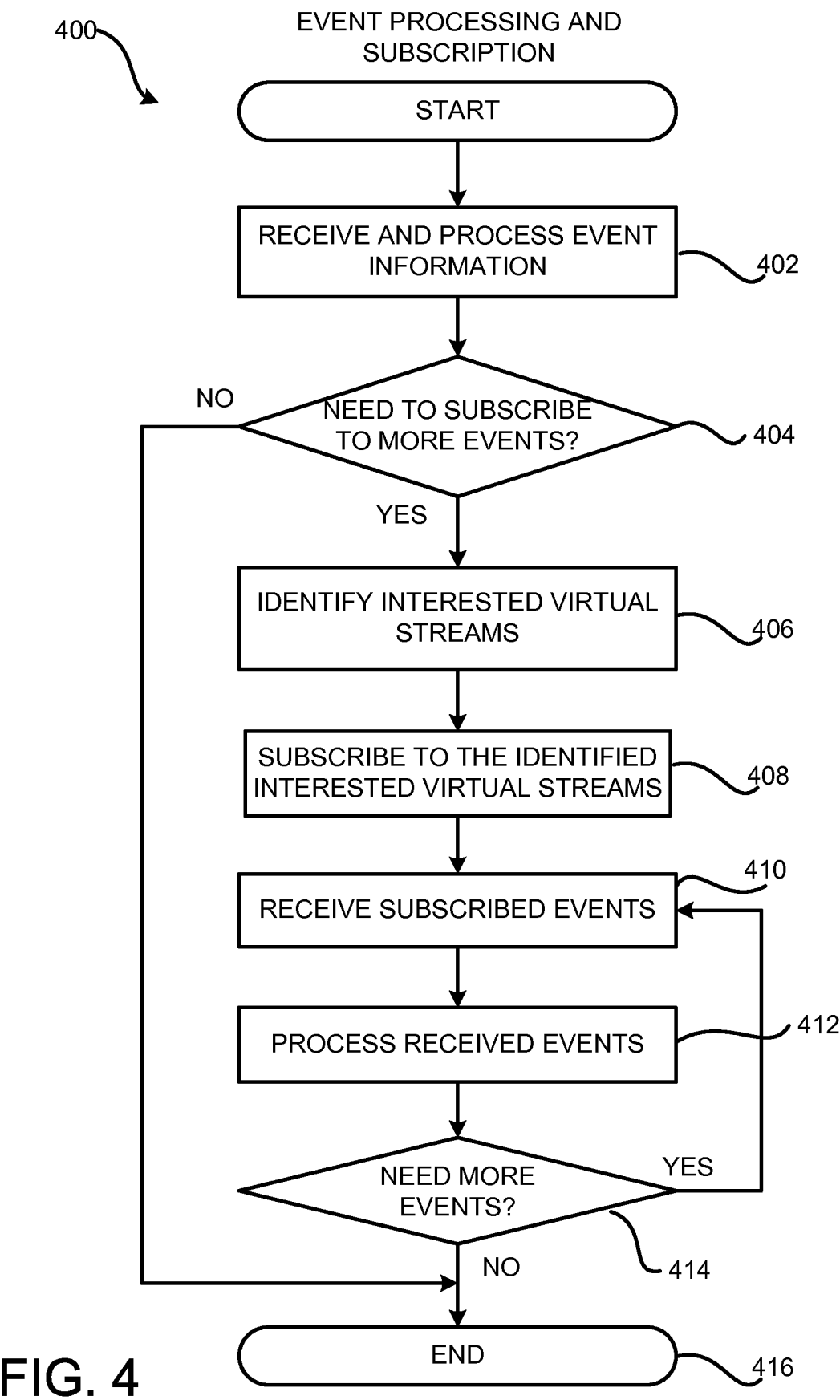
FIG. 4 is a flow diagram showing aspects of one illustrative process for event subscription and processing by a virtual processing agent.

FIG. 4 is a flow diagram illustrating aspects of one illustrative routine 400 for event processing and subscription. In some implementations, the routine 400 is performed by the virtual processing agent 102 described above in regard to FIGS. 1 and 2. It should be appreciated, however, that the routine 400 might also be performed by other entities in the stream processing system 100 illustrated in FIG. 1.

The routine 400 begins at operation 402 where an implicit subscriber processing agent 102 might receive an event 112 or event information of the event 112 from the runtime stream processing layer 124, and further process the received event 112 or event information. From operation 402, the routine 400 further proceeds to operation 404 where the implicit subscriber processing agent 102 may determine whether it needs to subscribe to more events 112 based on the received event 112 or event information. If it is determined that the implicit subscriber processing agent 102 needs to subscribe to more events, the routine proceeds to operation 406 where the implicit subscriber processing agent 102 may identify one or more event subscription virtual streams 206 from which the implicit subscriber processing agents 102 are interested in receiving events. At operation 408, the implicit subscriber processing agent 102 may subscribe to the identified event subscription virtual streams 206 through submitting event subscriptions 114 to the runtime stream processing layer 124. By submitting the event subscriptions 114, the implicit subscriber processing agent 102 may turn into an explicit subscriber processing agent 102 with respect to the submitted event subscriptions 114.

From operation 408, the routine 400 proceeds to operation 410 where the explicit subscriber processing agent 102 might receive the subscribed events that are published in the queue 106. As discussed above, if the event subscription 114 submitted at operation 408 specify past events, the events received at operation 410 might include those past events. The routine 400 then proceeds to operation 412 where the received events may be processed. The routine 400 further proceeds to operation 414 where it may be determined if the explicit subscriber processing agent 102 needs more events to process. If it is determined that more events are needed, the routine 400 returns back to operation 410 where the explicit subscriber processing agent 102 may receive more events 112 for processing. If it is determined at operation 414 that no more events are needed, or if it is determined at operation 404 that the implicit subscriber processing agent 102 does not need to subscribe to more events, the routine 400 proceeds to operation 416 where the routine 400 ends.

Figure 5A:
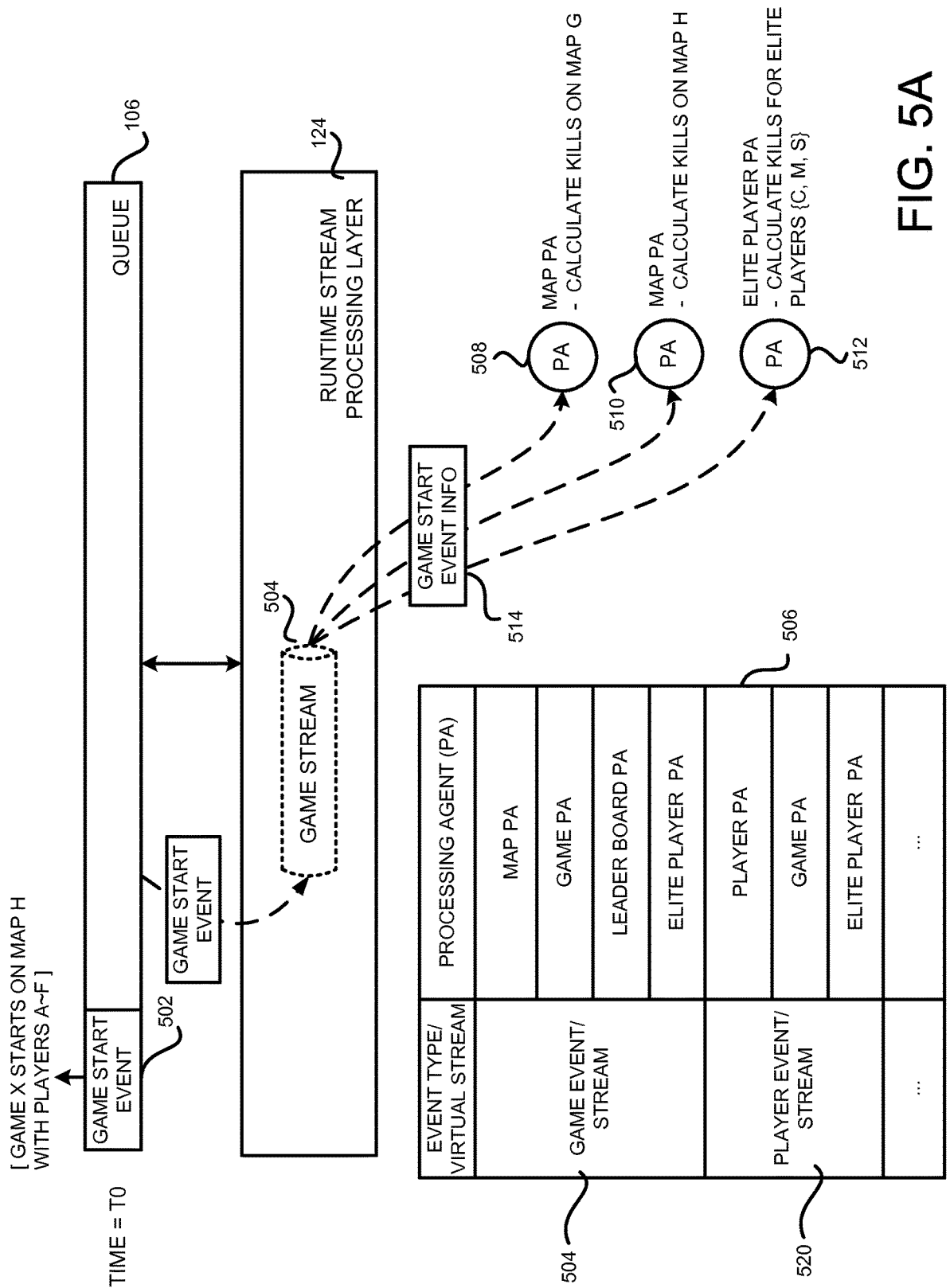
FIGS. 5A-5D illustrate operations by example virtual processing agents in response to events published in a queue at different points in time.

FIGS. 5A-5D illustrate operations by example virtual processing agents 102 in response to events 112 published in the queue 106 at different points in time, according to one or more aspects presented herein. As illustrated in FIG. 5A, the stream processing layer 124 of the runtime system 108 may maintain or otherwise generate an implicit activation table 506 that maps different types of events 112 or their corresponding event subscription virtual streams 206 to implicit subscriber processing agents 102. According to the example implicit activation table 506 shown in FIG. 5A, map processing agents, game processing agents, leader board processing agents, and/or elite player processing agents may be identified as implicit subscriber processing agents 102 of a game stream 504. Similarly, for a player stream 520, the potential implicit subscriber processing agents 102 might include player processing agents, game processing agents, and/or elite player processing agents. Based on the implicit activation table 506, the runtime stream processing layer 124 may identify and activate one or more implicit subscriber processing agents 102 as events 112 are received and published in the queue 106.

At time $T_0$, a game start event 502 is published in the queue 106, for example, through an event publication virtual stream 204. Data contained in the game start event 502 indicates that game X started on map H with players A-F currently in the game X. The runtime stream processing layer 124 may retrieve the game start event 502 from the queue 106, and identify implicit subscriber processing agents 102 of a game stream 504 that corresponds to the game start event 502. Based on the implicit activation table 506, the runtime stream processing layer 124 may determine that the implicit subscriber processing agents 102 of the game stream 504 may include the map processing agent 508 for calculating the number of kills on map G, the map processing agent 510 for calculating the number of kills on map H, and the elite play processing agent 512 for calculating the number of kills for elite players C, M and S. The runtime stream processing layer 124 may then generate game start event information 514 based on the game start event 502 and push it to the game stream 504 for delivery to the identified implicit subscriber processing agents 508, 510 and 512.

Figure 5B:
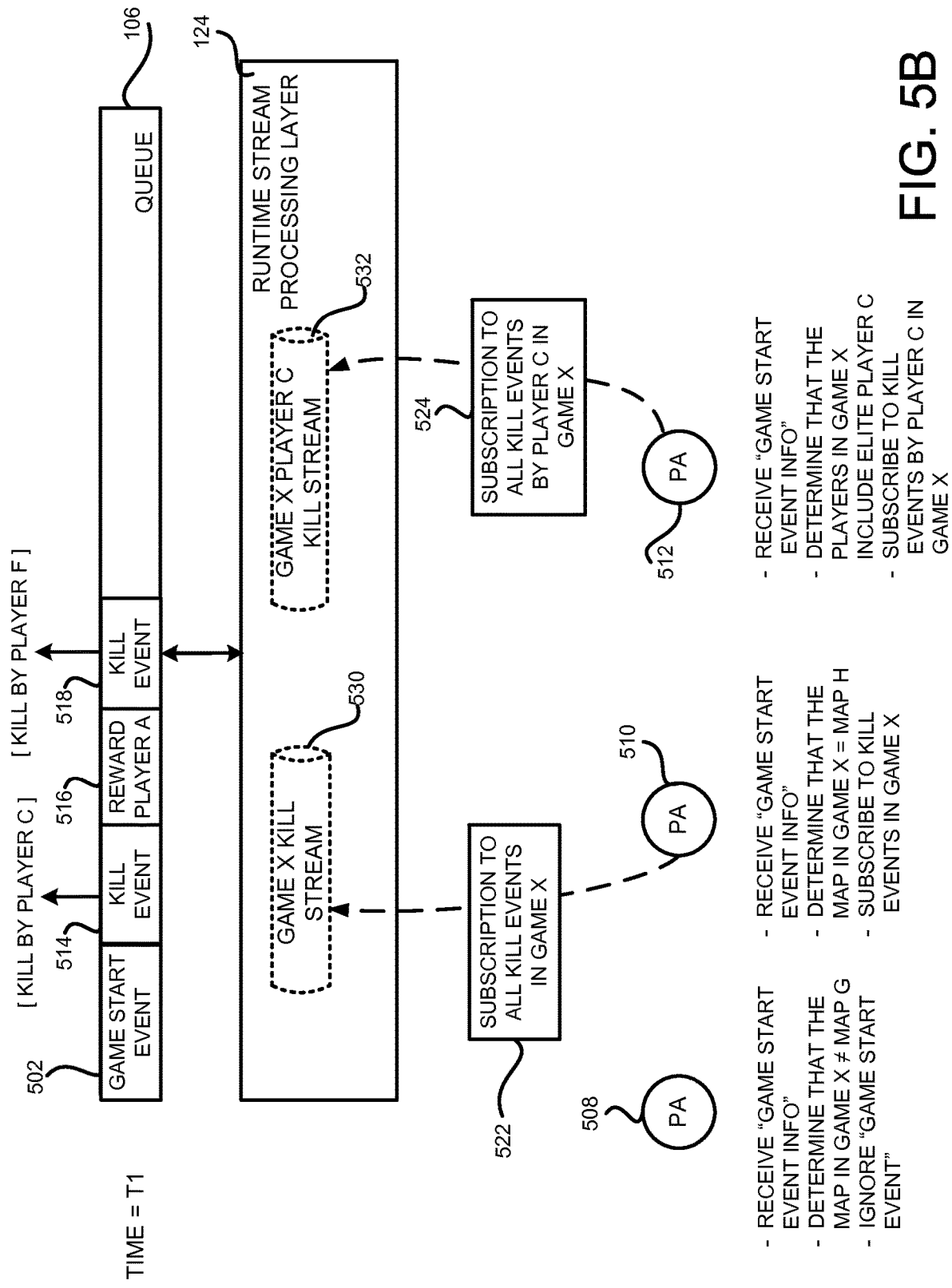

At time $T_1$ as shown in FIG. 5B, the game start event information 514 might have been delivered to and processed by the implicit subscriber processing agents 508, 510 and 512. At processing agent 508, it might be determined that the map H associated with the game X indicated in the game start event information 514 is different from the map G that the map processing agent 508 is interested in. As a result, the processing agent 508 might do nothing with respect to the received game start event information 514. At map processing agent 510, however, it may be determined that the map H contained in the game start event information 514 is what the map processing agent 510 is interested in, and thus the map processing agent 510 may then send a subscription 520 to subscribe to a game X kill stream 530 to receive all kill events in game X.

Similarly, the elite player processing agent 512 might determine that game X includes one of the elite players that it is processing, and thus might submit a subscription 524 to subscribe to a game X player C kill stream 532 to receive all kill events by player C in game X. It should be noted that while the game start event information 504 is being delivered to and processed at the processing agents 508, 510 and 512, there might be more events published in the queue 106, such as the kill event 514 by player C, the reward event 516 to reward player A, and the kill event 518 by player F.

Figure 5C:
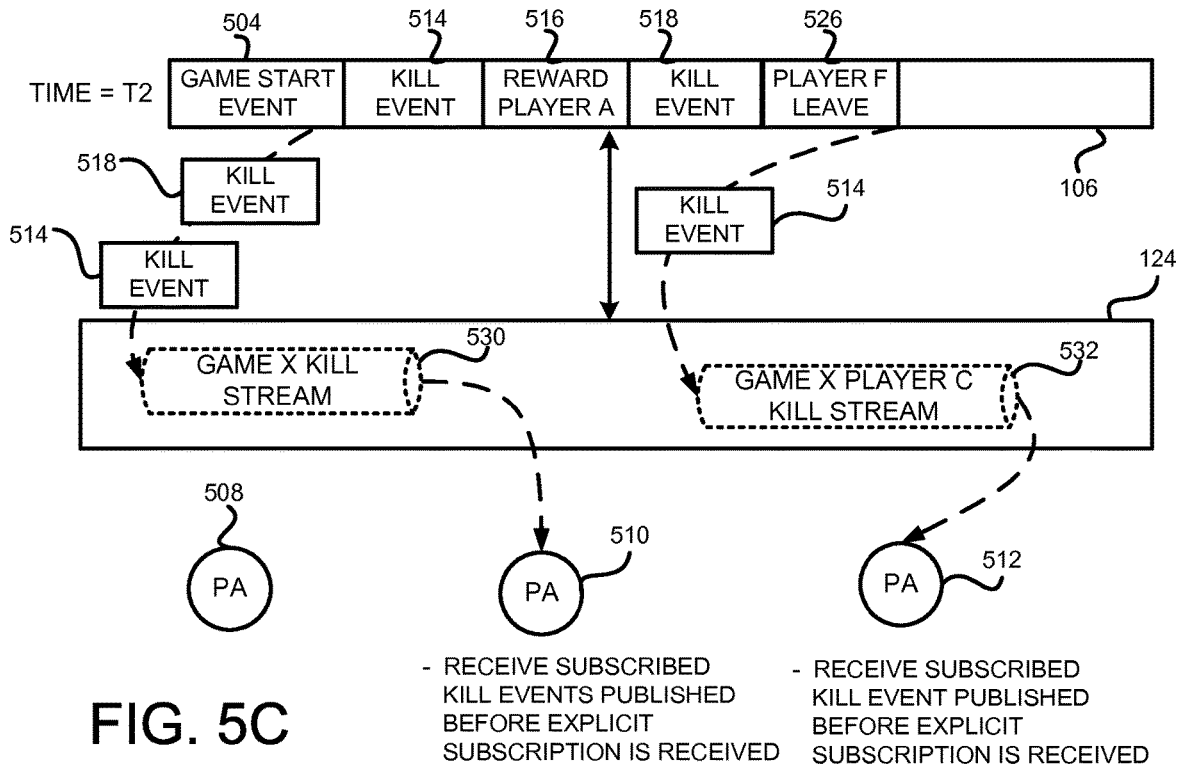

At time $T_2$ as shown in FIG. 5C, the runtime stream processing layer 124 may process the event subscriptions submitted by the map processing agent 510 and elite player processing agent 512. Since the subscription 522 requests all the kill events since the beginning of game X, the runtime stream processing layer 124 may determine that such a subscription includes past kill events 514 and 518 that are published before the subscription 522 is received. Likewise, the runtime stream processing layer 124 may also determine that the subscription 524 includes past kill event 514. Accordingly, the runtime stream processing layer 124 may retrieve the kill events 514 and 518 from the queue 106, send the kill events 514 and 518 to map processing agent 510 through the game X kill stream 530 and send the kill event 514 to the elite player processing agent 512 through the game X player C kill stream 532.

Figure 5D:
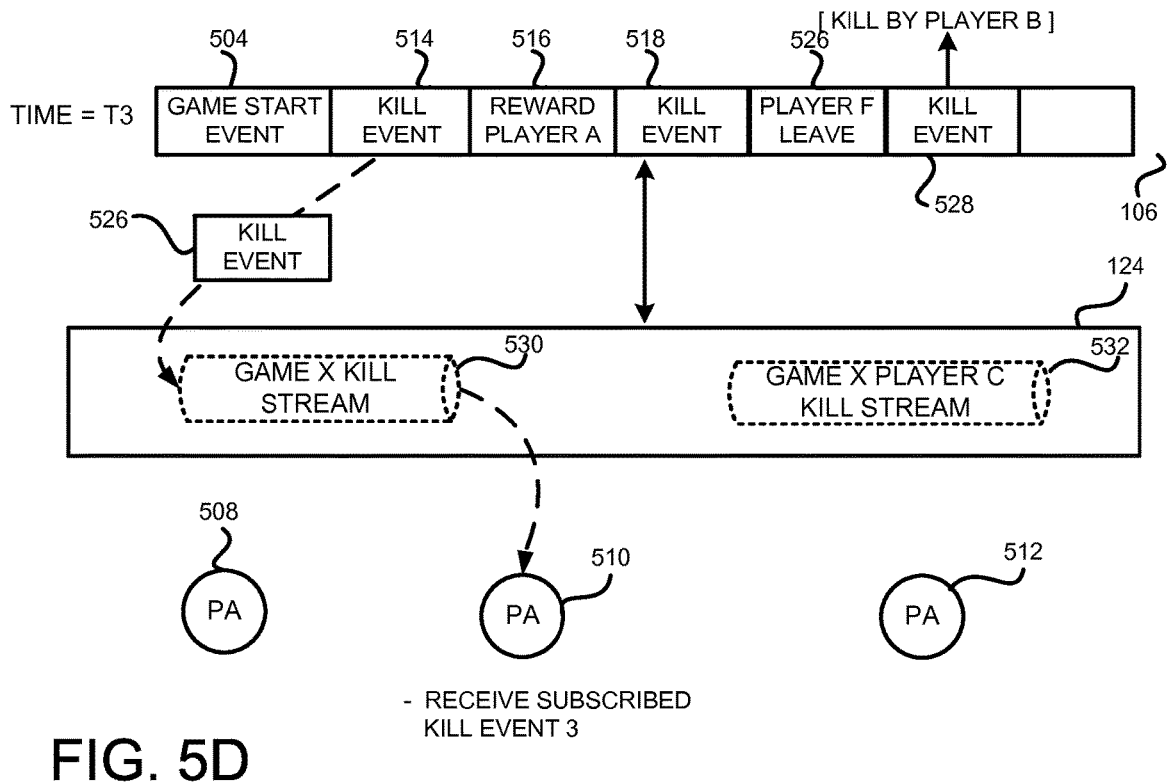

As shown in FIG. 5D, at time $T_3$, a new kill event 528 is published in the queue 106. The runtime stream processing layer 124 may retrieve the event 528 from the queue 106 and determine that this new kill event 528 belongs to the game X kill stream 530. The kill event 528 may then be pushed to the game X kill stream 530 and delivered to the map processing agent 510. The runtime stream processing layer 124 may continue to process and deliver more events as they are published in the queue 106 in a similar manner.

It can be seen from the above, by allowing an implicit subscriber processing agent 102 to receive information on events that it has not subscribed to, the stream processing agents 102 may be automatically activated based on events flowing through the system thereby supporting very granular stream processing units thus significantly simplifying the programming model. Furthermore, by reducing the definition of streams to the semantics of the events that are delivered over them, processing agents 102 may not need to be aware of the stream-topology and can instead focus on the specific events they wish to process, which further simplifies the programming model. In addition, by utilizing the technologies presented herein, ad-hoc definition of complex event detection and aggregation logic may be dynamically applied to the system without having to recompile or re-deploy the topology.

FIG. 6 shows an example computer architecture for a computing device 600 capable of storing and executing the components shown in FIG. 1. The computer architecture shown in FIG. 6 illustrates a conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above.

The computing device 600 includes a baseboard 602, or "motherboard," which is a printed circuit board to which a multitude of components or devices may be connected by way of a system bus or other electrical communication paths. In one illustrative aspect, one or more central processing units ("CPUs") 604 operate in conjunction with a chipset 606. The CPUs 604 may be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 600. The chipset 606 may further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM may also store other software components necessary for the operation of the computing device 600 in accordance with the aspects described herein.

The computing device 600 may operate in a networked environment using logical connections to remote computing devices and computer systems through a network, such as the local area network 620. The chipset 606 may include functionality for providing network connectivity through a network interface controller (NIC) 612, such as a gigabit Ethernet adapter. The NIC 612 is capable of connecting the computing device 600 to other computing devices over the network 620. It should be appreciated that multiple NICs 612 may be present in the computing device 600, connecting the computer to other types of networks and remote computer systems. The local area network 620 allows the computing device 600 to communicate with remote services and servers, such as a remote computer 650.

The computing device 600 may be connected to a mass storage device 616 that provides non-volatile storage for the computing device. The mass storage device 616 may store system programs, application programs, other program modules, and data, which have been described in greater detail herein. The mass storage device 616 may be connected to the computing device 600 through a storage controller 614 connected to the chipset 606. The mass storage device 616 may consist of one or more physical storage units. The storage controller 614 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 616, other storage media and the storage controller 614 may include MultiMediaCard (MMC) components, eMMC components, Secure Digital (SD) components, PCI Express components, or the like.

The computing device 600 may store data on the mass storage device 616 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 616 is characterized as primary or secondary storage, and the like.

For example, the computing device 600 may store information to the mass storage device 616 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 616 by detecting the physical states or characteristics of one or more particular locations within the physical storage units.

In addition to the mass storage device 616 described above, the computing device 600 may have access to other computer-readable storage media to store and retrieve information, such as program modules, data structures, or other data. Thus, although the runtime system 108 and other modules are depicted as data and software stored in the mass storage device 616, it should be appreciated that the runtime system 108 and/or other modules may be stored, at least in part, in other computer-readable storage media of the device 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 600. For purposes of the claims, the phrase "computer storage medium," "computer-readable storage medium," and variations thereof, does not include waves or signals per se and/or communication media.

The mass storage device 616 may store an operating system 622 utilized to control the operation of the computing device 600. According to one aspect, the operating system comprises the LINUX operating system. According to another aspect, the operating system comprises the WINDOWS® operating system from MICROSOFT Corporation. According to further aspects, the operating system may comprise the UNIX, Android, Windows Phone or iOS operating systems. It should be appreciated that other operating systems may also be utilized. The mass storage device 616 may store other system or application programs and data utilized by the computing device 600, such as the runtime system 108 and/or any of the other software components and data described above. The mass storage device 616 might also store other programs and data not specifically identified herein.

In one aspect, the mass storage device 616 or other computer-readable storage media is encoded with computer-executable instructions which, when loaded into the computing device 600, transform the computer from a general-purpose computing system into a special-purpose computer capable of implementing the aspects described herein. These computer-executable instructions transform the computing device 600 by specifying how the CPUs 604 transition between states, as described above. According to one aspect, the computing device 600 has access to computer-readable storage media storing computer-executable instructions which, when executed by the computing device 600, perform the various routines described above with regard to FIGS. 3 and 4. The computing device 600 might also include computer-readable storage media for performing any of the other computer-implemented operations described herein.

The computing device 600 may also include one or more input/output controllers 617 for receiving and processing input from an input device 619. The input device 619 may include a number of input devices, such as a keyboard, a mouse, a microphone, a headset, a touchpad, a touch screen, an electronic stylus, or any other type of input device. Similarly, the input/output controller 617 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

The disclosure presented herein may be considered in view of the following clauses.

Clause 1: A computer-implemented method for delivering events, the method comprising: receiving a publication of an event; identifying a processing agent for receiving information associated with the event based on configurations of the processing agent, wherein the processing agent does not explicitly subscribe to receive the event; determining if the processing agent is activated; in response to determining that the processing agent is not activated, activating the processing agent; delivering the information associated with the event to the processing agent; receiving a subscription to one or more events from the processing agent; and delivering the one or more events to the processing agent.

Clause 2: The method of clause 1, further comprising: determining if the subscription specifies one or more past events to be delivered; and in response to determining that the subscription specifies one or more past events to be delivered, delivering the one or more past events to the processing agent.

Clause 3: The method of clauses 1-2, wherein receiving the publication of the event in the queue comprises: receiving a request to publish the event in a queue; activating a virtual stream corresponding to the event; and publishing the event in the queue through the virtual stream.

Clause 4: The method of clauses 1-3, wherein the subscription to one or more events defines a virtual stream, and the subscription is a subscription to the virtual stream corresponding to the one or more events.

Clause 5: The method of clauses 1-4, wherein activating the processing agent comprises allocating system resources to the processing agent, and wherein the subscription to the virtual stream activates the virtual stream and causes system resources to be allocated to the virtual stream.

Clause 6: The method of clauses 1-5, further comprising: deactivating the virtual stream when no events are received in the virtual stream over a certain period of time by reclaiming the system resources allocated to the virtual stream; and deactivating the processing agent the processing agent becomes idle for a given period of time by reclaiming the system resources allocated to the processing agent.

Clause 7: The method of clauses 1-6, wherein the configuration of the processing agent is obtained programmatically or determined from a declarative definition of the processing agent.

Clause 8: The method of clauses 1-7, wherein the processing agent is addressable for delivering the event independent of whether the processing agent is activated or not activated.

Clause 9: A computer-readable storage medium having computer-executable instructions stored thereon which, when executed by a computer, cause the computer to: determine a processing agent for receiving an event that is published in a queue and that the processing agent does not explicitly subscribe to, wherein the event is published in the queue through a first virtual stream corresponding to the event; determine if the processing agent is activated; in response to determining that the processing agent is not activated, activate the processing agent; cause event information of the event to be delivered to the processing agent; process an explicit subscription to a second virtual stream defined by the explicit subscription, wherein the explicit subscription is submitted by the processing agent in response to the event information delivered to the processing agent; and cause events in the second virtual stream to be delivered to the processing agent.

Clause 10: The computer-readable storage medium of clause 9, wherein events published in the queue are persisted.

Clause 11: The computer-readable storage medium of clauses 9-10, comprising further computer executable instructions which, when executed by the computer, cause the computer to: determine if the second virtual stream includes past events published in the queue; and in response to determining that the second virtual stream includes past events published in the queue, cause the past events to be pushed to the second virtual stream and delivered to the processing agent.

Clause 12: The computer-readable storage medium of clauses 9-11, comprising further computer executable instructions which, when executed by the computer, cause the computer to: deactivate the second virtual stream when no events are received in the second virtual stream over a certain period of time by reclaiming the system resources allocated to the virtual stream; and deactivate the processing agent when the processing agent becomes idle for a given period of time by reclaiming the system resources allocated to the processing agent.

Clause 13: The computer-readable storage medium of clauses 9-12, wherein activating the processing agent comprises allocating system resources to the processing agent, and wherein the subscription to the second virtual stream activates the second virtual stream and causes system resources to be allocated to the second virtual stream.

Clause 14: The computer-readable storage medium of clauses 9-13, wherein the processing agent is addressable for delivering the event independent of whether the processing agent is activated or not activated.

Clause 15: The computer-readable storage medium of clauses 9-14, wherein the processing agent is obtained programmatically or determined based on a declarative definition of the processing agent.

Clause 16: A system, comprising one or more computing devices executing a runtime that is configured to: manage a queue for receiving and persisting publications of events; receive a publication of an event in a first virtual stream and forward the publication of the event to the queue; identify a processing agent for delivering event information of the event based on a configuration of the processing agent, wherein the processing agent does not explicitly subscribe to receive the event and is addressable for delivering the event information independent of whether the processing agent is activated or not activated; determine if the processing agent is activated; in response to determining that the processing agent is not activated, activate the processing agent; deliver the event information to the processing agent; receive an explicit subscription to events in a second virtual stream from the processing agent after the event information is delivered to the processing agent; determine whether the explicit subscription specifies past events published in the queue before the explicit subscription is received; in response to determining that the explicit subscription specifies past events, retrieve a past event from the past events published in the queue and push the past events to the second virtual streams, and deliver the events in the second virtual stream to the processing agent.

Clause 17: The system of clause 16, wherein activating the processing agent comprises allocating system resources to the processing agent, and wherein the subscription to the second virtual stream activates the second virtual stream and causes system resources to be allocated to the second virtual stream.

Clause 18: The system of clauses 16-17, further comprising a plurality of servers executing one or more processing agents, wherein the runtime is further configured to recover a processing agent after failure of one server on which the processing agent was activated by reactivating the processing agent on another server.

Clause 19: The system of clauses 16-18, wherein the configuration of the processing agent is obtained programmatically or determined from a declarative definition of the processing agent.

Clause 20: The system of clauses 16-19, wherein the runtime is further configured to: deactivate the second virtual stream when no events are received in the second virtual stream over a certain period of time by reclaiming the system resources allocated to the virtual stream; and deactivate the processing agent when the processing agent becomes idle for a given period of time by reclaiming the system resources allocated to the processing agent.

Based on the foregoing, it should be appreciated that concepts and technologies for subscribing, receiving and processing events are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example aspects and applications illustrated and described, and without departing from the true spirit and scope of the present invention, which is set forth in the following claims.

What is claimed is:

1. A computer-implemented method for delivering events to a processing agent executing on one or more servers, the method comprising:

receiving a publication of an event in a queue of events, wherein the event includes information that describes a player interaction with a game application;

mapping the event to a processing agent of a plurality of different processing agents, wherein the processing agent has not explicitly subscribed to receive the event;

determining that the processing agent is not activated;

in response to determining that the processing agent is not activated, activating the processing agent such that the processing agent is available to provide functionality to the game application;

delivering the event to the processing agent;

receiving a subscription from the processing agent;

receiving one or more additional publications of one or more additional events in the queue of events, the one or more additional events occurring after the subscription is received from the processing agent;

delivering, based at least in part on the subscription, the one or more additional events to the processing agent;

determining that the subscription requests that one or more past events be delivered, the one or more past events having been published in the queue of events prior to the receiving the subscription from the processing agent; and in response to determining that the subscription requests that the one or more past events be delivered, delivering the one or more past events to the processing agent.

2. The method of claim 1, wherein receiving the publication of the event in the queue of events comprises:
receiving a request to publish the event in the queue of events;
activating a virtual stream corresponding to the event; and
publishing the event in the queue of events through the virtual stream.

3. The method of claim 2, wherein the subscription defines the virtual stream.

4. The method of claim 3, wherein activating the processing agent comprises allocating system resources to the processing agent.

5. The method of claim 1, wherein a configuration of the processing agent is obtained programmatically or determined from a declarative definition of the processing agent.

6. The method of claim 1, wherein the processing agent is addressable for delivering the event independent of whether the processing agent is activated or not activated.

7. The method of claim 1, wherein the processing agent is configured to receive a particular type of event and the subscription requests all events of the particular type of event that are published in the queue of events including the event, the one or more additional events, and the one or more past events.

8. The method of claim 1, further comprising using an activation table to map the event to the processing agent.

9. The method of claim 1, wherein the processing agent is configured to receive different events that occur within an individual session of the game application.

10. The method of claim 1, wherein the processing agent is configured to receive different events caused by an individual player participating in a session of the game application.

11. The method of claim 1, wherein the processing agent is configured to receive different events caused by an individual device participating in a session of the game application.

12. A system, comprising one or more computing devices having instructions that, when executed by one or more processors, configure the one or more computing devices to:
manage a queue for receiving and persisting publications of events, wherein an individual event includes information that describes a player interaction with a game application;
receive a publication of an event in a virtual stream;
forward the publication of the event to the queue;
map the event to a processing agent of a plurality of different processing agents, wherein the processing agent has not explicitly subscribed to receive the event and the processing agent is addressable for delivering the event independent of whether the processing agent is activated or not activated;
determine that the processing agent is not activated;
in response to determining that the processing agent is not activated, activate the processing agent such that the processing agent is available to provide functionality to the game application;
deliver the event to the processing agent;
receive an explicit subscription to the virtual stream from the processing agent after the event is delivered to the processing agent;
receive one or more additional publications of one or more additional events in the virtual stream after the explicit subscription is received;
forward the one or more additional publications of the one or more additional events to the queue;
deliver, based at least in part on the explicit subscription, the one or more additional events to the processing agent;
determine that past events have been published in the queue before the explicit subscription is received;
retrieve the past events that have been published in the queue; and
deliver the past events to the processing agent.

13. The system of claim 12, wherein activating the processing agent comprises allocating system resources to the processing agent.

14. The system of claim 12, wherein the instructions further configure the one or more computing devices to:
deactivate the virtual stream when no events are received in the virtual stream over a certain period of time by reclaiming system resources allocated to the virtual stream; and
deactivate the processing agent when the processing agent becomes idle for a given period of time by reclaiming system resources allocated to the processing agent.

15. The system of claim 12, wherein the processing agent is configured to receive a particular type of event and the explicit subscription requests all events of the particular type that are published in the queue including the event, the one or more additional events, and the past events.

16. The system of claim 12, wherein the instructions further configure the one or more computing devices to use an activation table to map the event to the processing agent.

17. A system comprising:
one or more processors; and
one or more computer-readable storage media having computer-executable instructions stored thereon which, when executed by the one or more processors, cause the system to:
receive a publication of an event in a queue of events, wherein the event includes information that describes a player interaction with a game application;
map the event to a processing agent of a plurality of different processing agents, wherein the processing agent has not explicitly subscribed to receive the event;
determine that the processing agent is not activated;
in response to determining that the processing agent is not activated, activate the processing agent such that the processing agent is available to provide functionality to the game application;
deliver the event to the processing agent;
receive a subscription from the processing agent;
receive one or more additional publications of one or more additional events in the queue of events, the one or more additional events occurring after the subscription is received from the processing agent;

deliver, based at least in part on the subscription, the one or more additional events to the processing agent;

determine that the subscription requests that one or more past events be delivered, the one or more past events having been published in the queue of events prior to the receiving the subscription from the processing agent; and in response to determining that the subscription requests that the one or more past events be delivered, deliver the one or more past events to the processing agent.

18. The system of claim 17, wherein the processing agent is responsible for processing different events that occur within an individual session of the game application.

19. The system of claim 17, wherein the processing agent is responsible for processing different events caused by an individual player participating in a session of the game application.

20. The system of claim 17, wherein the processing agent is responsible for processing different events caused by an individual device participating in a session of the game application.

\* \* \* \* \*